Feb. 19, 1929.                L. S. BRACH                1,702,490
                            ELECTRICAL RELAY
                          Filed July 20, 1926           2 Sheets-Sheet 1
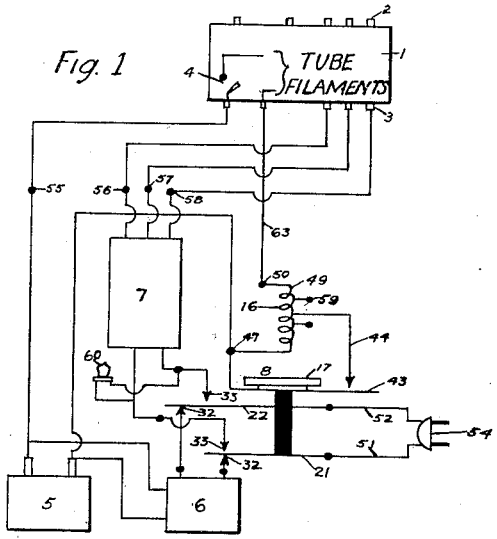
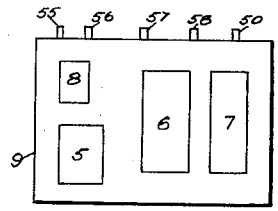
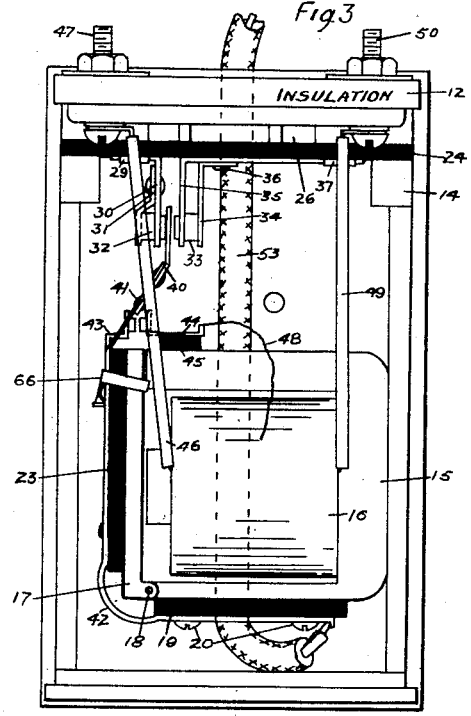
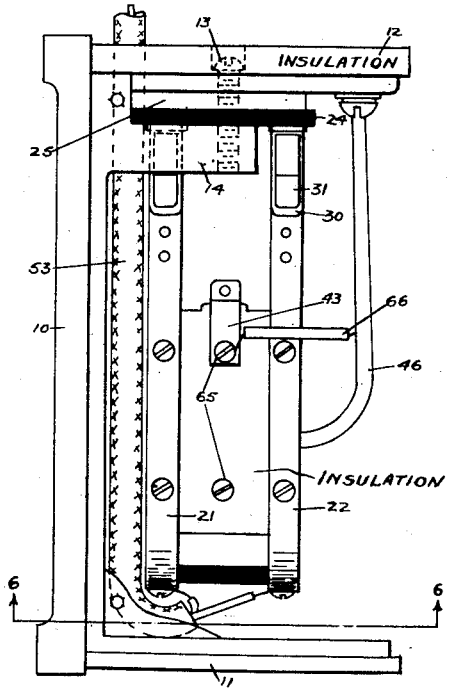
INVENTOR
LEON S. BRACH
BY
A.D.T. Libby
ATTORNEY

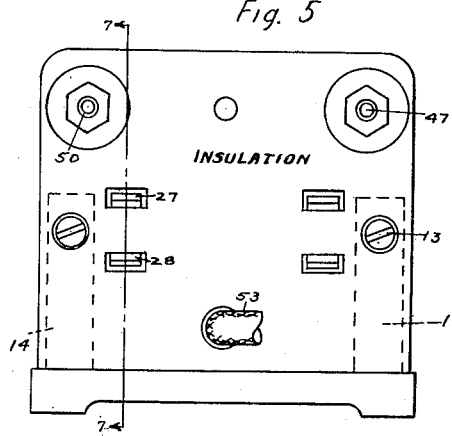
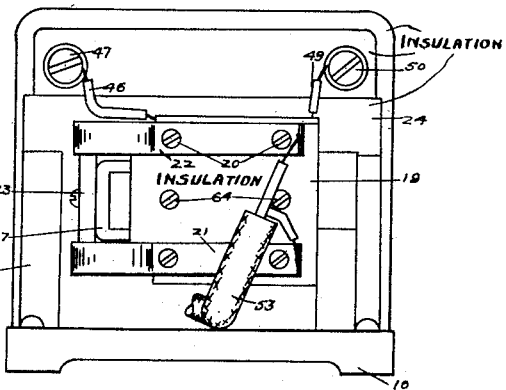
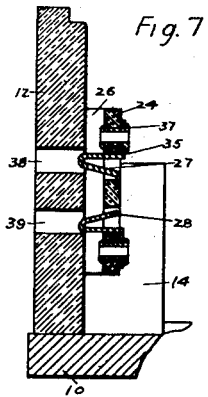
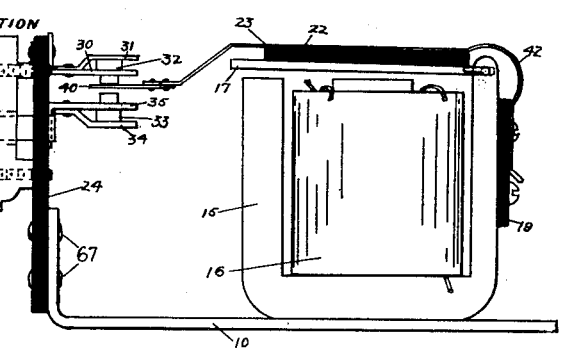
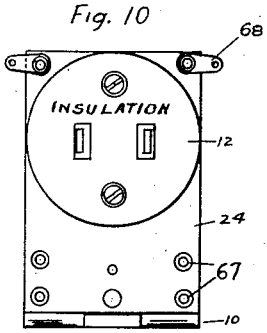
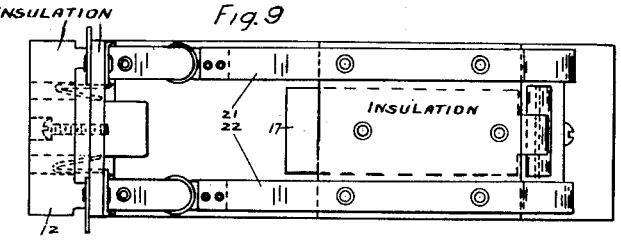

Patented Feb. 19, 1929.

1,702,490

UNITED STATES PATENT OFFICE.

LEON S. BRACH, OF EAST ORANGE, NEW JERSEY, ASSIGNOR TO L. S. BRACH MFG. CO., OF NEWARK, N. J.

ELECTRICAL RELAY.

Original application filed March 6, 1926, Serial No. 92,667. Divided and this application filed July 20, 1926. Serial No. 123,694.

This invention is a division of my copending application S. N. 92,667, filed March 6th, 1926, and the present invention relates to a special type of relay, particularly adapted for use in a radio receiving system illustrated and described in said co-pending application.

In order that the functioning and purposes of the relay may be clearly understood, its application to said radio receiving system will be set forth in the following specification.

In the usual receiving system, there is used in connecting a receiving set per se; a storage battery for furnishing current to the filaments of tubes of the audion type, and which battery is generally referred to as the "A" battery; then the so-called "B" battery is used to supply potential for the tube plate circuits and a rectifier of some sort is used for charging the "A" battery.

It is now becoming a quite common practice to use a device known as a "B" eliminator, an apparatus capable of supplying current suitable for the plate circuits of the tubes, from the main source of supply, which is usually alternating current. At the present time, in order to charge the storage battery, it is usually necessary to take this away from the immediate vicinity of the radio receiving set, to a place where the rectifier can be connected to it.

In a receiving system of the type above set forth in my copending application, the apparatus used in the system may be brought together into one cabinet or into at least a cabinet having a compartment which will contain, the storage battery, a rectifier, and "B" eliminator and means for controlling the circuits connecting these various pieces of apparatus, and with the radio receiving set.

It is the principal object of my present invention to provide a controlling device or relay for the main purpose just outlined, which is simple, but rugged in construction and positive in its action, and adapted to be readily connected with the various units, over which it exercises control.

The detailed construction and the application of my invention is set forth in the annexed drawing, wherein:

Figure 1, is a diagram showing the manner in which the various units may be interconnected.

Figure 2, is a plan view showing the assembly of the "A" battery, "B" eliminator, rectifier and the control relay, all in one container.

Figure 3, is a plan view of the relay controlling device with the cover removed.

Figure 4, is a view of the right side of the relay of Figure 3.

Figure 5, is an end view of the relay showing the manner of making electrical connections thereto.

Figure 6, is a view of the opposite end of the relay along the line 6—6 of Figure 4.

Figure 7 is a section on the line 7—7 of Figure 5.

Figure 8, is a side elevation of a relay similar to that shown in Figures 3 to 7 inclusive, but with certain of the parts arranged in a somewhat different manner.

Figure 9, is a plan view of Figure 8, while

Figure 10, is an end view from the left, of Figures 8 and 9.

Referring now to the details, wherein like numbers refer to corresponding parts in the various views; 1, is a radio receiving set, having terminals 2, for connecting the antenna, ground and loud speaker thereto, and terminals 3, for making other connections to be later referred to; 4 is a control switch, for switching the current to the filaments of the tubes of the audion type, which are mounted within the receiving set 1. 5, is a storage battery, generally referred to as the "A" battery, 6, is a rectifier of any suitable type, such as the ordinary tube rectifier and 7 illustrates a "B" eliminator, while 8, illustrates a relay, the details of which will be later referred to. The units 5, 6, 7 and 8 are arranged in a container 9, which is preferably placed closely adjacent to the receiving set 1.

The operation of the system will be best understood after consideration of the construction of the relay per se, which comprises a casing having a base 10, and an end 11, preferably integral with the base 10, and both preferably made of metal. The front of the casing is composed of a plate 12, preferably of strong insulating material, and held to the base 10, in any satisfactory manner as by screws 13, that engage a pair of lugs 14, carried by the base 10. Mounted on the base 10, is an electromagnetic structure comprising a field and core member 15, carrying an electromagnet 16; preferably carried on the core structure is an armature 17, pivoted at 18. An insulator 19 is attached to the core structure with any suitable means as by screws 64, and fastened to the insulator 19 as by screws 20, is a pair of contact members 21 and 22, which are suitably spaced apart and extend forwardly over the armature 17, being supported thereon by an insulator 23, which is fastened to the armature 17 in any satisfactory manner as by screws 65.

The contact members 21 and 22, extend some distance beyond the armature into cooperative relationship with certain stationary contacts supported from the end plate 12. These latter stationary contacts are mounted on an insulator 24, that is held between the end plate 12 and the lugs 14, by the screws 13, spacing members 25, being preferably used, so as to provide a certain distance 26 between the member 24 and the plate 12, in order that distance may be provided for spring members 27 and 28 (see Figure 7) that are formed so as to provide a resilient switch blade contact, for sliding plug connectors usually provided on electric light plugs.

The spring members 27 and 28 are held to the insulator 24 in any satisfactory manner as by eyelets 37, which also serve to clamp the end of the contact pieces 35 (see Figure 3). Toward the free end of the contact pieces 35 is attached by an eyelet 36, a second contact strip 34, and between the members 34 and 35 is held a contact 33, preferably of carbon, as the current supply handled by this contact and its cooperating contact is usually at 110 volts. Opposite to the contact 33, is a similar contact 32, and similarly arranged between contact pieces 30 and 31, which are fastened to the insulating strip 24 by an eyelet 29, which also acts to clamp a contact plug member similar to 27.

The spring clips 27 and 28 extend through holes in the insulating strip 24, and in alignment with holes 38 and 39 in the plate 12 (see Figure 7), and it is through these holes that a plug similar to 54 (shown in Figure 1) may be inserted to make connection with the spring clips 27 and 28.

It is to be understood from Figure 3, that while only one set of contacts 32 and 33 are shown there is another pair directly below these, as will be evident by reference to Figure 4.

The ends of the contact strips 21 and 22 are preferably provided with special contact tips 40, that may be fastened thereto as by rivets 41. I prefer to use for the contact tips 40, some metal, such as an alloy of silver, altho other satisfactory contact tips may be used. As will be seen from Figure 3, the contact strips 21 and 22 are formed at 42, so as to provide a tension such as will normally hold the armature 17 in released position, or in other words, so that the contact tips 40, of the members 21 and 22, may be in engagement with the back contacts 32, and when the electro-magnet 16, is energized contact tips 40 engage the front contact 33.

Mounted on the insulator 23, that is carried on the armature 17, is an auxiliary contact 43, which is adapted to cooperate with a contact 44, which may be mounted on the electro-magnet structure, but insulated therefrom, as by insulator 45. The contact 43 is connected at 66 with the lead 46, coming from the binding post 47, while the contact 44 is connected by a wire 48, to some tap taken from the electro-magnet winding 16, the opposite end of which is connected by a wire 49 to a binding post 50.

Referring now to Figure 1, the application of the relay to the system will be readily apparent; the contact members 21 and 22 are adapted to have conductors 51 and 52 connected thereto, as indicated generally by the cable 53, conductors 51 and 52 preferably terminate in a plug 54, that is adapted to fit a cooperating member, which in turn fits the usual electric light socket, thereby connecting the main source of current supply from the house lighting circuit directly to the switch contacts 21 and 22, which are normally in engagement with contacts 32, wired to the rectifier 6. The rectifier 6, is preferably permanently connected with the "A" battery 5. The container carrying units 5, 6, 7 and 8 is preferably provided with binding posts 50, 55, 56, 57 and 58, from which leads are taken directly to the receiving set, 1. Now on operation of the switch 4, of the receiving set the battery current from the "A" battery 5, goes through the electro-magnet 16, through the filaments of the tubes back to the battery 5. The electro-magnet 16, operates the armature 17, switching the contact members 21 and 22, to the front contacts 33, thereby transferring the main source of current from the rectifier 6, to the "B" eliminator 7, so that the receiving set 1, is then in a position to function.

When it is desired to turn off the receiving set the switch 4, is operated which de-energizes the relay and the main source of supply of current is switched back to the rectifier 6. At this point it may be remarked that the rectifier 6, is of such a nature or so adjusted that it supplies a small current to the battery 5, and is known in the trade as a "trickle" charger.

In order that the current through the tube filaments may not be cut down objectionably by the electro-magnet 16, the auxiliary contacts 43 and 44, as described may be used, and so connected as to cut out any part of the winding 16, since various taps 59, may be brought out therefrom and connections made in any satisfactory manner. Thus the wire 63, may be connected to a post representing a given tap on the relay winding, when a five tube set is used and to a different post connected to another tap on the relay winding, when for example five to ten tubes are used.

In order to light the container 9, or the radio set 1, or both, one or more lamps 60 may be utilized and connected as shown in Figure 1. Where a lamp 60 is used in the set 1, this is preferably arranged so as to illuminate the dials, so that the receiving set may be quickly adjusted to the desired station, and while I have shown in the diagram only one lamp, it is to be understood that one or more may be used, as has been described.

In the form of relay shown in Figures 8, 9 and 10, the base 10 is preferably punched from a piece of metal and the insulator 24 is attached to an upturned end of the base 10, in any satisfactory manner as by screws, rivets or eyelets 67. The insulator 12, is somewhat different from the corresponding insulators shown in the previous figures and is adapted to be attached directly to the insulator 24, by means of the screws 13. By mounting the insulator 12, in the manner shown in Figures 8 to 9 inclusive, it is obvious that the relay may be mounted inside either of the rectifier units 6 or 7, so that the front portion of the insulator 12 will come flush with the casing of either of said units. When so mounted the individual cover for the relay may or may not be used. The electro-magnetic structure carries the field and core member 15, and the electro-magnet 16, is arranged on the base 10, so that the armature 17, while positioned in the same general relationship with respect to the magnet core structure is arranged to be at the top of the relay, when the relay is set on the base 10, rather than at the side as shown in Figures 3 and 4.

In Figures 3 to 6, inclusive I have shown the sets of both pair of contacts 32 and 33 arranged to have connections made thereto through the medium of sliding plug contacts as is more clearly shown in Figure 7.

Figures 8, 9, and 10 illustrate how at least one set of the contacts, namely 32, may have connections made directly to the contact pieces 30 and 31, while connections to the other or front contact or contacts 33, are adapted to be made by a sliding plug connection as heretofore described.

It is to be understood that the relay may be arranged with substantially any desired number of contacts whereby the circuit may be controlled at one or at a plurality of points. In Figures 7, 8 and 9, the cover is not shown and the connection wires have been omitted.

It will be evident that the detailed construction of the relay may be varied considerably without departing from the spirit of my invention and the scope of the appended claims.

Having thus described my invention what I claim is:

1. A relay specially adapted for the purposes described, comprising; a base carrying a cover, an electro-magnet on the base, an insulator having openings therein and carrying stationary contacts, movable contacts to cooperate with said stationary contacts, and an armature operated by said electro-magnet for actuating said movable contacts, said stationary contacts having extended parts positioned within said openings, and formed into jack spring contacts to receive a plug having substantially parallel contacts.

2. A relay especially adapted for the purposes described comprising, a casing, stationary contact elements carried by an insulator supported on one end of the casing, said casing end and insulator having openings therein in alignment with parts of said contact elements, an electromagnet within the casing near the end opposite to that having said openings, an armature movably carried by said electromagnet, contact members of resilient material having their ends carried by the electro-magnet structure and extending over and fastened to the armature and projecting beyond the armature into operative relationship with said stationary contacts, said parts of the stationary elements being formed to receive sliding plug members adapted to be inserted through said openings, said movable contact members acting to normally hold the armature in released position, and having means for attaching an outside source of current thereto.

3. A relay especially adapted for the purposes described comprising; a casing, stationary contact elements carried by an insulator supported on one end of the casing, said casing end having openings therein, said insulator having openings in line with the openings in the casing, said contact elements having parts punched and formed from resilient material and fastened to said insulator so as to lie in said openings and adapted to receive sliding plug members, an electromagnet within the casing, an armature movably carried on the magnet structure, contact members of resilient material mounted on but insulated from the magnet structure and formed over and fastened to the armature and projecting into cooperative relationship with said stationary contacts, said movable contact members also acting to normally hold the armature in released position.

4. A relay especially adapted for the purposes described comprising; a casing, stationary contact elements carried by the casing, an electro-magnet within the casing and having an armature carrying contact members in operative relationship to said stationary contacts, said stationary contact elements having parts formed so outside connections thereto may be completed through the medium of sliding plug members, and means carried by the relay structure for eliminating a part of the electro-magnet winding.

5. A relay especially adapted for the purposes described comprising; a casing, stationary contact elements carried by the casing, an electro-magnet within the casing and having an armature carrying contact members in operative relationship to said stationary contacts, said stationary contact elements having parts formed so outside connection thereto may be completed through the medium of sliding plug members.

6. A relay for the special purpose described, comprising a base, an insulator having openings therein carried by one end of the base, an electro-magnet on the other end of the base, at least one pair of stationary contacts mounted on said insulator, so as to be in alignment with said openings therein, a movable contact arranged to cooperate with said pair of stationary contacts, an armature operated by said electromagnet for actuating said movable contact, at least one of said stationary contacts having an element thereof formed and extended into one of said openings, so outside connection therethrough may be completed through the medium of sliding plug members.

7. A relay for the purpose described comprising; a base, an insulator carried by one end of the base, an electromagnet carried on the other end of the base, at least one pair of stationary contacts mounted on said insulator, a movable contact arranged to cooperate with said pair of stationary contacts, an armature operated by said electromagnet for actuating said movable contact, at least one of said stationary contacts having an element thereof formed so outside connection thereto may be completed through the medium of sliding plug members, said formed element extending through said insulator and a second insulator having plug openings therein mounted adjacent said first insulator so said openings are in operative alignment with said formed elements.

8. A relay for the purpose described comprising; a base, an insulator carried by one end of the base substantially at right angles thereto, at least one pair of stationary contacts mounted on the insulator, means for making connection with said contacts; said means for at least one contact consisting of an element extending through the insulator and formed to receive a sliding plug member; a second insulator mounted in front of the first insulator and having openings to guide the plug member into engagement with said formed element, an electromagnet on the base, an armature for the electro-magnet and a movable contact positioned between said stationary contacts and operated by said armature.

9. A relay for the purpose described comprising; a base, an insulator carried by one end of the base, a stationary contact mounted on the insulator and having an element extending through the insulator and formed to receive a sliding plug member, a second insulator mounted in front of the first insulator and having openings to guide the plug member into engagement with said formed element, an electro-magnet on the base, an armature for the electro-magnet and a movable contact member for cooperating with said stationary contact and operated by said armature.

10. A switching mechanism comprising; a base, an insulator carried by the base, at least one stationary pair of contacts mounted on the insulator, and each having an element extending through the insulator and formed to receive substantially flat parallel plug contact members, a second insulator mounted in front of the first insulator and having openings to guide the plug members into engagement with said formed elements, movable contact members for completing a circuit including said stationary contacts and means carried by the base for actuating said movable contact member.

11. A switching mechanism comprising a base, an insulator carried substantially at right angles to the base and having openings therein for a pair of spaced substantially flat parallel plug contact members; stationary contact members to be engaged by said plug members, mounted adjacent said openings, movable contact members for completing a circuit including said stationary contacts, means carried by the base for actuating said movable contact members and a cover fitting on the base over said contacts and switching means.

In testimony whereof, I affix my signature.

LEON S. BRACH.